United States Patent [19]

Rockwell

[11] Patent Number: 5,270,692
[45] Date of Patent: Dec. 14, 1993

[54] DIGITIZER CURSOR/MOUSE WITH UNITARY SWITCH ACTUATORS

[75] Inventor: Lynn H. Rockwell, Mesa, Ariz.

[73] Assignee: CalComp Inc., Anahiem, Calif.

[21] Appl. No.: 869,839

[22] Filed: Apr. 16, 1992

Related U.S. Application Data

[63] Continuation of Ser. No. 431,884, Nov. 6, 1989, abandoned.

[51] Int. Cl.$^5$ .............................................. G09G 5/00
[52] U.S. Cl. ..................... 345/163; 33/1 M; 178/18
[58] Field of Search .............. 340/706, 709, 710; 178/18, 19; 74/471; 33/1 M; 200/293

[56] References Cited

U.S. PATENT DOCUMENTS

| | | | |
|---|---|---|---|
| 4,429,200 | 1/1984 | Glenn et al. | 200/293 |
| 4,652,871 | 3/1987 | Tsukada et al. | 340/710 |
| 4,739,315 | 4/1988 | Soma et al. | 340/710 |
| 4,806,917 | 2/1989 | Hosogoe | 340/710 |
| 4,906,843 | 3/1990 | Jones et al. | 340/710 |
| 4,952,919 | 8/1990 | Nippoldt | 340/706 |

FOREIGN PATENT DOCUMENTS

0348153 12/1989 United Kingdom .............. 340/710

*Primary Examiner*—Jeffery Brier
*Attorney, Agent, or Firm*—Wm. F. Porter, Jr.; Donald A. Streck

[57] ABSTRACT

This is a low-cost cursor for a digitizing tablet which provides the user with the feel of a mouse. There is a case bottom piece for sliding on the surface of the digitizing tablet and a pair of microswitches. A printed circuit board fits in the case bottom piece with the pair of switches mounted behind one another thereon. A transparent front-piece is disposed over the printed circuit board with slots therethrough through which the switches are disposed. The front-piece has a front portion extending outward from a front end and parallel to the bottom surface and has an annular armature formed thereon with a concentric pair of cross-hairs and a sensing coil of wire wound around the armature. A connecting cable of wires is connected to the sensing coil of wire and the switches. There is also a case top piece attached over the case bottom piece to form a hollow case which is tapered from back to front to give the case the feel of a mouse. The case top piece has a pair of longitudinal side pieces with a torsion mounting strip extending transversely between them. The torsion mounting strip comprising a rectangular torsion bar having a vertical member extending upward therefrom with a switch actuator arm formed at the top and generally in the contour of the top surface of the top piece. The switch actuator arm has a pair of actuator fingers extending downward therefrom on opposite sides of the vertical member in alignment with and in close proximity to actuator buttons of the switches.

8 Claims, 2 Drawing Sheets

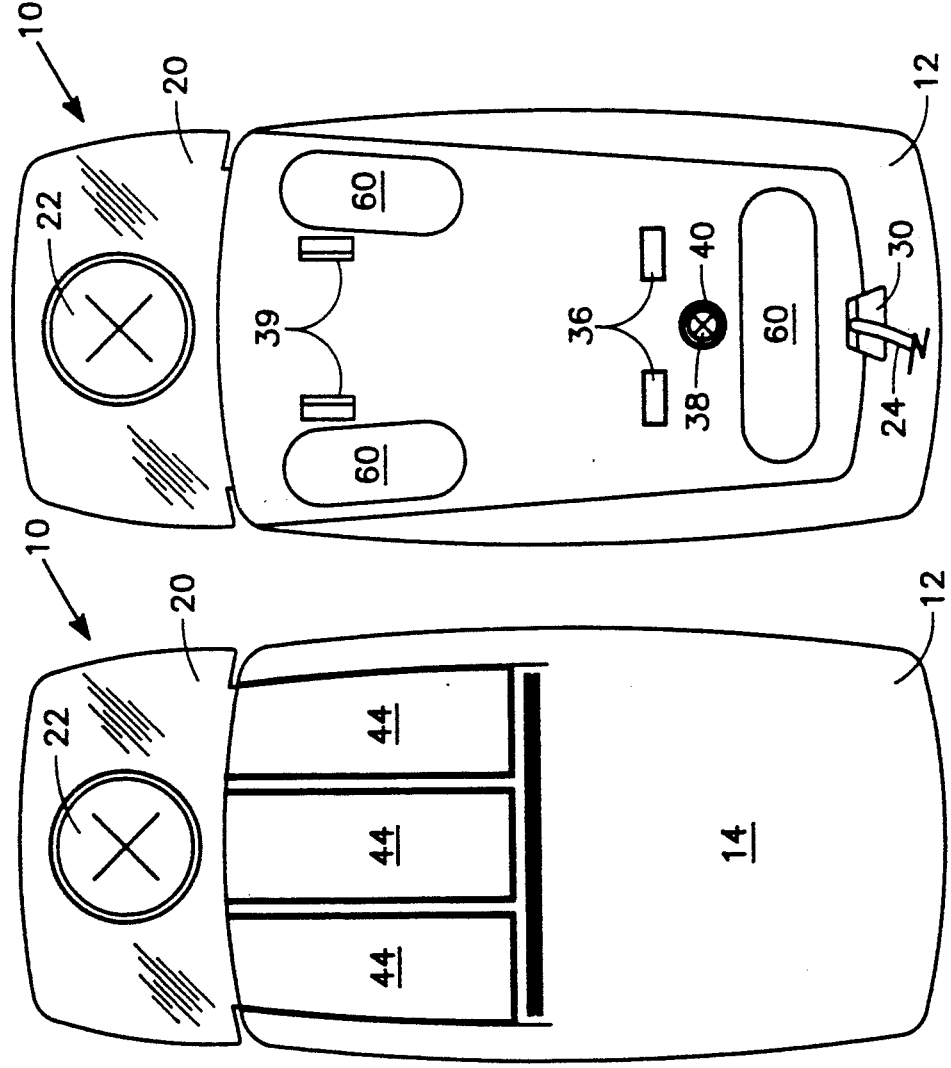

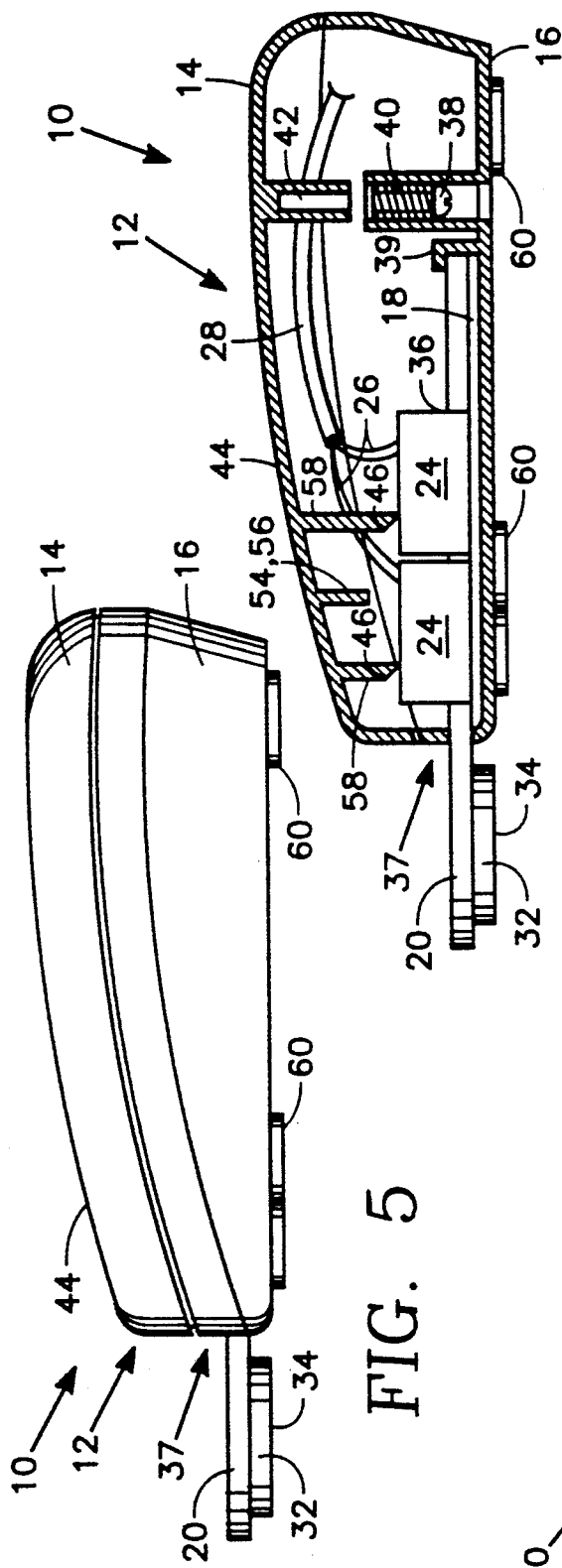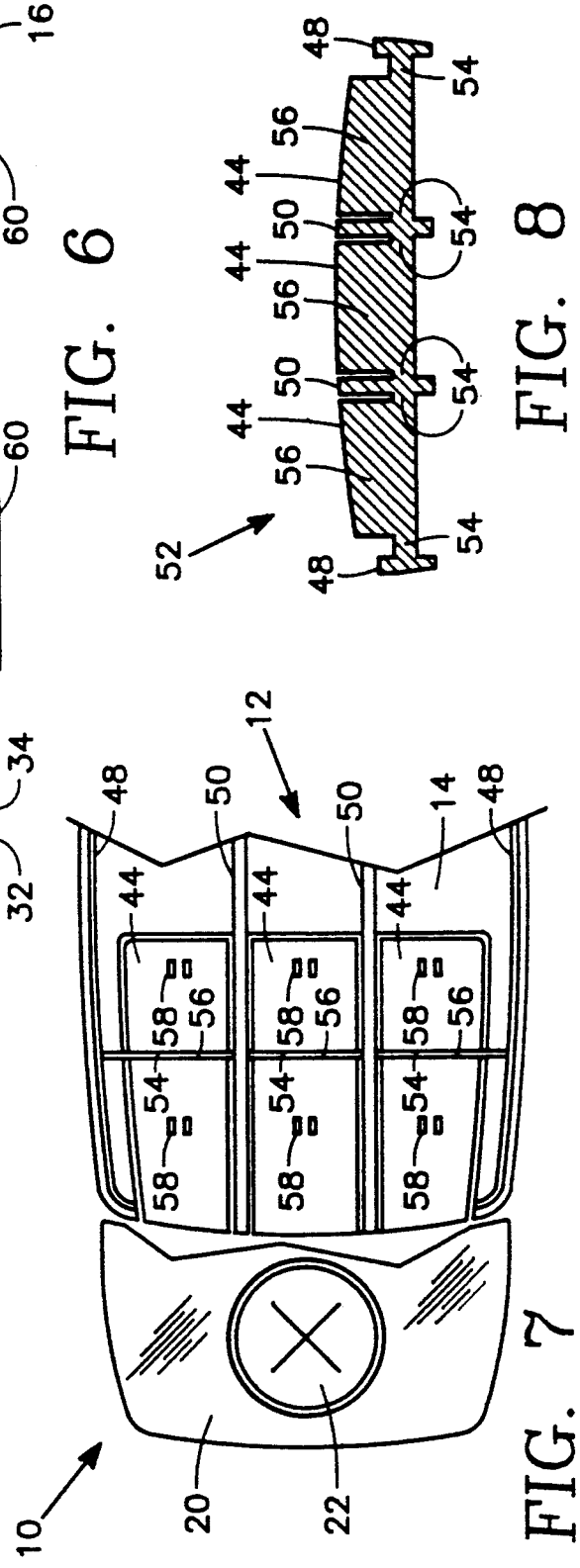

DIGITIZER CURSOR/MOUSE WITH UNITARY SWITCH ACTUATORS

This is a continuation of application Ser. No. 431,884 filed Nov. 6, 1989, now abandoned.

BACKGROUND OF THE INVENTION

This invention relates to digitizer tablets and the cursors used therewith and, in particular, to a cursor for use with a digitizing tablet which is simple and inexpensive to build and which provides the user with the feel of a mouse input device comprising, a case bottom piece having a flat bottom surface for sliding on the surface of the digitizing tablet, the case bottom piece having a bore therethrough at a back end thereof; at least two pairs of switches each including a short stroke actuating button; a printed circuit board sized to fit and disposed on an inner surface of the case bottom piece, the printed circuit board having each of the pair of switches mounted thereon side-by-side with respect to the other of the pair of switches with the actuating buttons thereof pointed vertically upward with respect to the inner surface and with one of the switches disposed longitudinally behind the other; a transparent front-piece disposed over the printed circuit board, the front-piece having slots therethrough through which the switches are disposed, the front-piece further having a front portion extending outward from a front end of the case bottom piece and parallel to the bottom surface, the front end having an annular armature formed thereon and having positioning means formed concentrically within the armature for positioning the armature at a desired point on the digitizing tablet to be sensed; a sensing coil of wire wound around the armature; a connecting cable of wires passing through the bore and electrically connected to the sensing coil of wire and the switches; and, a case top piece disposed over and releasably attached to the case bottom piece to form a hollow case in combination with the case bottom piece, the case top piece being tapered from a back end thereof towards a front end thereof to give the hollow case the feel of a mouse input device, the case top piece having a pair of longitudinal side pieces and a longitudinal rib extending downward from an inner surface of the case top piece and disposed between the longitudinal side pieces, a first torsion mounting strip extending transversely between one of the side pieces and the rib and a second torsion mounting strip extending transversely between the other of the side pieces and the rib, each of the first and second torsion mounting strips having a vertical member extending upward therefrom with a switch actuator arm formed at a top end thereof generally in the contour of a top surface of the top piece, each switch actuator arm having a pair of actuator fingers extending downward therefrom on opposite sides of the vertical member so as to be in alignment with and in close proximity to a top surface of respective ones of the actuator buttons of a one of the pair of switches disposed thereunder, whereby when one of the actuator arms is depressed on one end, it rotates slightly as a result of a twisting of its torsion bar an amount sufficient for the actuator finger under that end to depress the actuator button of the switch under that end of the switch actuator arm an amount which activates that switch and when pressure on the switch actuator arm is released, the switch actuator arm returns to its original position thereby opening the associated switch from a self-biasing force of the torsion bar.

Digitizer pad are well known in the art. In such devices, a pointing device is moved over the surface of a tablet and its absolute position on the tablet with reference to an X-Y coordinate system thereof is input to a computer when a switch on the pointing device is depressed by the user. The pointing devices typically take one of two forms—a pen/stylus or a "puck". A pen type pointing device has the position of the tip thereof sensed and there is usually only one switch associated with it which is actuated by pressing the tip against the tablet surface and/or by pressing a button on the barrel portion thereof. A puck type pointing device typically has a transparent portion with cross-hairs formed in it. The position of the cross-hairs is what is sensed. Usually, there are several buttons on the top of the puck body connected to associated switches. One of the switches causes the position of the cross-hairs to be detected while the remaining switches allow the user to provide choice inputs to programs using the digitizing tablet for an input device.

Another well known input device for use with computers is the "mouse". The mouse is self-contained and outputs a signal indicating sliding movement of the mouse over a surface in the X and Y directions. A typical mouse has from one to three switches on it, typically actuated by finger pressure along a front edge of the mouse. While digitizing tablets offer more power and flexibility as input devices to various computer programs, the mouse type input devices are more popular with personal computer (PC) users primarily for two reasons—cost and size. The typical mouse requires only about six inches by six inches of movement room and costs in the $75–100 range. By contrast, a typical "small" digitizer tablet is 16×16 and costs about $500. For those users who have a digitizer tablet, there are mouse simulation programs which will allow the puck to be moved over the surface of the tablet and the signal therefrom to be interpreted as relative movement in the manner of a mouse so that the user does not have to disconnect (or switch) between the digitizer tablet and the mouse.

In a co-pending patent application entitled DUAL-MODE CURSOR/MOUSE DIGITIZER TABLET SYSTEM by Steven R. Schmenk and Donald A. Beauvais, Ser. No. 07/993,973, which is a continuation of application Ser. No. 869,101 filed Apr. 16, 1992, now abandoned, which was in turn a continuation of application Ser. No. 432,073 filed Nov. 6, 1989, now abandoned, and assigned to the common assignee of this application, a digitizing tablet system is disclosed which is intended to have a small footprint like a mouse and a low cost approaching that of a mouse so that it can truly become a mouse substitute with respect to input devices for computers. This system, which is soon to be commercially available from the assignee hereof under the trademark WIZ, required many innovative approaches to the design, construction, and manufacturing methods in order to make it meet its design object of being a truly viable mouse replacement product which can still provide users with a commercial grade input device.

As part of the product, a digitizing cursor was required which operated in the sensing mode of a digitizing puck while having the feel of a mouse to a user.

Wherefore, it is an object of this invention to provide a digitizer cursor/mouse which is of simplified construction and easy to build at low cost.

It is another object of this invention to provide a digitizer cursor/mouse which includes bi-directional switch actuators as part of a unitary construction.

It is yet another object of this invention to provide a digitizer cursor/mouse which operates by movement across the surface of a digitizing tablet but which has the feel of a mouse.

Other objects and benefits of the invention will become apparent from the detailed description which follows hereinafter when taken in conjunction with the drawing figures which accompany it.

SUMMARY

The foregoing objects have been achieved by the case of the present invention for a position/movement indicating input device for use with a computer which is simple and inexpensive to build and which includes integral bi-directional self-biased switch activating arms comprising, a case bottom piece having a flat bottom surface for sliding on a surface to indicate position/-movement; a pair of switches each including a short stroke actuating button; a printed circuit board sized to fit and disposed on the inner surface, the printed circuit board having the pair of switches mounted thereon with the actuating buttons thereof pointed vertically upward with respect to the inner surface and with one of the switches disposed longitudinally behind the other; sensing means carried by the bottom portion for developing a signal reflecting movement of the bottom surface over a surface; connecting means carried by the bottom portion for connecting a computer to the sensing means and the switches; and, a case top piece disposed over and releasably attached to the case bottom piece to form a hollow case in combination with the case bottom piece, the case top piece having a pair of longitudinal side pieces with a torsion mounting strip extending transversely between them, the torsion mounting strip comprising a torsion bar having a vertical member extending upward therefrom, the vertical member having a switch actuator arm formed at a top end thereof generally in the contour of a top surface of the top piece, the switch actuator arm having a pair of actuator fingers extending downward therefrom on opposite sides of the vertical member so as to be in alignment with and in close proximity to a top surface of respective ones of the actuator buttons of the switches, whereby when the actuator arm is depressed on one end it rotates slightly as a result of a twisting of the torsion bar an amount sufficient for the actuator finger under that end to depress the actuator button of the switch under that end of the switch actuator arm an amount which activates that switch and when pressure on the switch actuator arm is released the switch actuator arm returns to its original position thereby opening the associated switch from a self-biasing force of the torsion bar.

In the preferred embodiment as disclosed herein, the sensing means comprises a sensing coil of wire mounted on a transparent front-piece whereby the case in combination with the components mounted in combination therewith is a cursor for use with a digitizing tablet.

To provide for four switches to be operated by a user, the case additionally comprises at least two pairs of the switches, the printed circuit board having each of the pair of switches mounted thereon side-by-side with respect to the other of the pair of switches with the actuating buttons thereof pointed vertically upward with respect to the inner surface and with one of the switches disposed longitudinally behind the other; and, a longitudinal rib extending downward from an inner surface of the case top piece and disposed between the longitudinal side pieces, a first torsion mounting strip extending transversely between one of the side pieces and the rib and a second torsion mounting strip extending transversely between the other of the side pieces and the rib, each of the first and second torsion mounting strips having a vertical member extending upward therefrom with a switch actuator arm formed at a top end thereof generally in the contour of a top surface of the top piece, each switch actuator arm having a pair of actuator fingers extending downward therefrom on opposite sides of the vertical member so as to be in alignment with and in close proximity to a top surface of respective ones of the actuator buttons of a one of the pair of the switches disposed thereunder.

DESCRIPTION OF THE DRAWINGS

FIG. 1 is a top view of the cursor/mouse of this invention.

FIG. 2 is a bottom view of the cursor/mouse of this invention.

FIG. 3 is a back view of the cursor/mouse of this invention.

FIG. 4 is a front view of the cursor/mouse of this invention.

FIG. 5 is a left side view of the cursor/mouse of this invention.

FIG. 6 is a partially cutaway view of the left side view of FIG. 5.

FIG. 7 is a partial inside view of the top portion of the cursor/mouse of this invention showing how the bi-directional switch actuator arms are integrally formed as part of the top piece.

FIG. 8 is a partial cutaway cross-sectional view of the torsion mounting strip for the switch actuator arms.

DESCRIPTION OF THE PREFERRED EMBODIMENT

The cursor/mouse of this invention comprises only four pieces and is shown in its preferred embodiment in FIGS. 1–8 where it is generally indicated as 10. There is a case 12 having a top piece 14 and a bottom piece 16 along with a printed circuit board 18 and a front-piece 20. The top piece 14 and the bottom piece 16 of the case 12 are injection molded of a high impact plastic which is colored to prevent seeing into the case while the front-piece 20 is also injection molded; but of a transparent plastic so that the cross-hairs 22 molded therein can be positioned as desired. The preferred embodiment as depicted in the drawing figures has six switches for use by a user; but, as those skilled in the art will readily appreciate, more or fewer switches could be employed, if desired.

The switches 24 are mounted on the printed circuit board 18 in three adjacent pairs, one switch 24 behind the other as best seen in FIG. 6. The switches 24 are connected to wires 26 in a connecting cable 28 which passes out through the hole 30 provided therefor in the bottom piece 16. A sensing coil of wire 32 is wound around a cylindrical armature 34 formed into the forward portion of the front-piece 20 for the purpose. The wire 32 is also connected to wires in the cable 28. The cross-hairs 22 are molded into the front-piece 20 in the center of the armature 34. The cursor/mouse 10 is assembled by placing the printed circuit board 18 on the inside of the bottom piece 16 and the front-piece 20 is snapped in place over the printed circuit board 18 with the switches 24 extending up through rectangular slots 36 in the back portion of the front-piece 20 provided for the purpose. The front-piece 20 is held in place by a plurality of retention clips 39 molded into the bottom piece 16. The top piece 14 is then attached to the bottom piece 16 by hooking a front lip portion 37 to the bottom piece 16 and then screwing the single screw 38 through a molded-in bore 40 in the bottom piece 16 into a mating molded-in bore 42 in the top piece 14. While the typical digitizer "puck" has the entire bottom thereof covered with a felt-like material or the like for purposes of sliding over the surface of the digitizer pad, it will be noted that the bottom surface of the bottom piece has slider feet 60 molded therein in the manner of the typical mouse device so as to give the cursor/mouse the movement feel of a mouse.

In addition to the simplified construction as described above, a key point of novelty of the cursor/mouse 10 of this invention is the integral bi-directional switch actuator arms 44 molded into the top piece 14. The preferred switch for the switches 24 is a microswitch having a short-stroke actuator button 46 extending upward from the top as best seen in FIG. 6. The top piece 14 has longitudinal side pieces 48 formed therein as well as a pair of longitudinal ribs 50 extending downward from the top. A torsion mounting strip 52 for resiliently support the switch actuator arms 44 is formed between the side pieces 48 and the ribs 50 as best seen with reference to FIG. 7 and 8. The torsion mounting strip 52 comprises a rectangular torsion bar 54 having three vertical members 56 extending upward therefrom. Each of the vertical members 56 has a switch actuator arm 44 formed at the top thereof generally in the contour of the top piece 14. As can be seen, the case 12 is of a tapered design being larger at the back and tapering towards the front where the switch actuator arms 44 are located so as to give the cursor/mouse 10 the tactile feel of a typical prior art mouse input device. Thus, when gripped along the side edges with the thumb and outer fingers, the fore finger and middle finger extend along the top of the case 12 and terminate adjacent the switch actuator arms 44 for easy depression thereof to actuate selected ones of the switches 24.

As best seen in FIG. 6, each of three switch actuator arms 44 has a pair of actuator fingers 58 extending downward therefrom on opposite sides of the vertical member 56 so as to be in alignment with and in close proximity to the tops of respective ones of the actuator buttons 46 of the switches 24 under the particular switch actuator arm 44. Thus, when an actuator arm 44 is depressed on one end, it rotates slightly as a result of a twisting of the torsion bar 54 under the vertical member 56 associated therewith. This rotation is sufficient for the actuator finger 58 under that end to depress the actuator button 46 to the switch 24 under that end of the switch actuator arm 44 an amount which will activate that switch 24. When the pressure on the switch actuator arm 44 is released, the switch actuator arm 44 returns to its original position (thereby opening the associated switch 24) from the self-biasing force of the torsion bar 54 under the vertical member 56 associated therewith.

Thus, it can be seen from the foregoing description and the accompanying drawing figures that the present invention has truly met its stated objectives by providing a cursor/mouse device to be used in association with a digitizer tablet which is simple and inexpensive to construct and which provides a user thereof with the feeling of using a mouse instead of a digitizer cursor or the typical prior art variety.

Wherefore, having thus described my invention, what is claimed is:

1. A cursor for use with a digitizing tablet which is simple and inexpensive to build and which provides the user with the feel of a mouse input device comprising:

a) a case bottom piece having a flat bottom surface for sliding on the surface of the digitizing tablet, an inner surface of said bottom piece having retaining clips formed therein, said case bottom piece having a bore therethrough adjacent a back end thereof;

b) a pair of switches each switch including a short stroke actuating button;

c) a printed circuit board sized to fit and disposed on said inner surface of said case bottom piece between said retaining clips, said printed circuit board having said pair of switches mounted thereon with said actuating buttons thereof pointed vertically upward with respect to said inner surface and with one of said switches disposed longitudinally behind the other;

d) a transparent front-piece disposed over said printed circuit board and held in place by engagement with said retaining clips, said front-piece having slots therethrough through which said switches are disposed, said front-piece further having a front portion extending outward from a front end of said case bottom piece and parallel to said bottom surface, said front end having an annular armature formed thereon and having a pair of cross-hairs formed concentrically within said armature;

e) a sensing coil of wire wound around said armature;

f) a connecting cable of wires passing through said bore and electrically connected to said sensing coil of wire and said switches; and, g) a case top piece disposed over and releasably attached to said case bottom piece to form a hollow case in combination with said case bottom piece, said case top piece being tapered from a back end thereof towards a front end thereof to give said hollow case the feel of a mouse input device, said case top piece having a pair of longitudinal side pieces with a mounting strip extending transversely between them, said mounting strip comprising a vertical member extending upward towards said case top piece, said vertical member having a switch actuator arm formed at a top end thereof generally in the contour of a top surface of said top piece whereby said vertical member and said switch actuator arm in combination are generally T-shaped in cross-section, said switch actuator arm having two ends and a pair of actuator fingers associated with respective ones of said two ends extending downward therefrom on opposite sides of said vertical member so as to be in alignment with and in close proximity to a top surface of respective ones of said actuator buttons of the said switches, whereby when said actuator arm is depressed on one of said two ends it rotates against a biasing force of said switch actuator arm and said vertical member an amount sufficient for the said actuator finger under said one of said two ends to depress said actuator button of the said switch thereunder an amount which activates that said switch and when pressure on said switch actuator arm is released said switch actuator arm returns to its original position thereby opening the associated said switch from said biasing force.

2. The cursor of claim 1 and additionally comprising:
a) at least two pairs of said switches, said printed circuit board having each of said pair of switches mounted thereon side-by-side with respect to the other of said pair of switches with said actuating buttons thereof pointed vertically upward with respect to said inner surface and with one of said switches disposed longitudinally behind the other; and,
b) a longitudinal rib extending downward from an inner surface of said case top piece and disposed between said longitudinal side pieces, a first said mounting strip extending transversely between one of said side pieces and said rib and a second said mounting strip extending transversely between the other of said side pieces and said rib, each of said first and second mounting strips comprising a said vertical member extending upward with a said switch actuator arm formed at a top end thereof generally in the contour of a top surface of said top piece, each said switch actuator arm having a pair of actuator fingers extending downward therefrom on opposite sides of said vertical member so as to be in alignment with and in close proximity to a top surface of respective ones of said actuator buttons of a one of said pair of said switches disposed thereunder.

3. A cursor for use with a digitizing tablet which is simple and inexpensive to build and which provides the user with the feel of a mouse input device comprising:
a) a case bottom piece having a flat bottom surface for sliding on the surface of the digitizing tablet, an inner surface of said bottom piece having retaining clips formed therein, said case bottom piece having a bore therethrough adjacent a back end thereof;
b) first and second switches wherein said first switch includes a first short stroke actuating button and said second switch includes a second short stroke actuating button;
c) a printed circuit board sized to fit and disposed on said inner surface of said case bottom piece between said retaining clips, said printed circuit board having said first and second switches mounted thereon with said first and second actuating buttons thereof pointed vertically upward with respect to said inner surface and with said second switch disposed longitudinally behind said first switch;
d) a transparent front-piece disposed over said printed circuit board and held in place by engagement with said retaining clips, said front-piece having slots therethrough through which said first and second switches are disposed, said front-piece further having a front portion extending outward from a front end of said case bottom piece and parallel to said bottom surface, said front end having an annular armature formed thereon and having a pair of cross-hairs formed concentrically within said armature;
e) a sensing coil of wire wound around said armature;
f) a connecting cable of wires passing through said bore and electrically connected to said sensing coil of wire and said first and second switches; and,
g) a case top piece disposed over and releasably attached to said case bottom piece to form a hollow case in combination with said case bottom piece, said case top piece being tapered from a back end thereof towards a front end thereof to give said hollow case the feel of a mouse input device, said case top piece having a pair of longitudinal side pieces with a mounting strip extending traversely between them, said mounting strip comprising a vertical member extending upwards towards said case top piece, said vertical member having a switch actuator arm formed at a top end thereof generally in the contour of a top surface of said top piece whereby said vertical member and said switch aducator arm in combination are generally T-shaped in cross-section, said switch actuator arm having first and second ends and first and second actuator fingers associated with said first and second ends, respectively, and extending downward therefrom on opposite sides of said vertical member so as to be in alignment with and in close proximity to a top surface of said first and second actuator buttons of said first and second switches, respectively, whereby when said actuator arm is depressed on said first end it rotates against a biasing force of said switch actuator arm and said vertical member an amount sufficient for said first actuator finger under said first end to depress said first actuator button of the said first switch thereunder an amount which activates that said first switch and when pressure on said switch actuator arm is released said switch actuator arm returns to its original position thereby opening said first switch from said biasing force, and whereby when said actuator arm is depressed on said second end it rotates against a biasing force of said switch actuator arm and said vertical member an amount sufficient for said second actuator finger under said second end to depress said second actuator button of the said second switch thereunder an amount which activates that said second switch and when pressure on said switch actuator arm is released said switch actuator arm returns to its original position thereby opening said second switch from said biasing force.

4. The cursor of claim 2 and additionally comprising:
a) at least two pairs of said switches, said printed circuit board having each of said pair of switches mounted thereon side-by-side with respect to the other of said pair of switches with said actuating buttons thereof pointed vertically upward with respect to said inner surface and with one of said switches disposed longitudinally behind the other; and,
b) a longitudinal rib extending downward from an inner surface of said case top piece and disposed between said longitudinal side pieces, a first said mounting strip extending transversely between one of said side pieces and said rib and a second said mounting strip extending transversely between the other of said side pieces and said rib, each of said first and second mounting strips comprising a said vertical member extending upward with a said switch actuator arm formed at a top end thereof generally in the contour of a top surface of said top piece, each said switch actuator arm having a pair of actuator fingers extending downward therefrom on opposite sides of said vertical member so as to be in alignment with and in close proximity to a top surface of respective ones of said actuator buttons of a one of said pair of said switches disposed thereunder.

5. A cursor for use with a digitizing tablet which is simple and inexpensive to build and which provides the user with the feel of a mouse input device comprising:
   a) a case bottom piece having a flat bottom surface for sliding on the surface of the digitizing tablet, an inner surface of said bottom piece having retaining clips formed therein, said case bottom piece having a bore therethrough adjacent a back end thereof;
   b) first and second switches wherein said first switch includes a first short stroke actuating button and said second switch includes a second short stroke actuating button;
   c) a printed circuit board sized to fit and disposed on said inner surface of said case bottom piece between said retaining clips, said printed circuit board having said first and second switches mounted thereon with said first and second actuating buttons thereof pointed vertically upward with respect to said inner surface and with said second switch disposed longitudinally behind said first switch;
   d) a sensing coil carried by said case bottom piece;
   e) a connecting cable of wires passing through said bore and electrically connected to said sensing coil of wire and said first and second switches; and,
   f) a case top piece disposed over and releasably attached to said case bottom piece to form a hollow case in combination with said case bottom piece, said case top piece being tapered from a back end thereof towards a front end thereof to give said hollow case the feel of a mouse input device, said case top piece having a pair of longitudinal side pieces with a mounting strip extending traversely between them, said mounting strip comprising a vertical member extending upward towards said case top piece, said vertical member having a switch actuator arm formed at a top end thereof generally in the contour of a top surface of said top piece whereby said vertical member and said switch actuator arm in combination are generally T-shaped in cross-section, said switch actuator arm having first and second ends and first and second actuator fingers associated with said first and second ends, respectively, and extending downward therefrom on opposite sides of said vertical member so as to be in alignment with and in close proximity to a top surface of said first and second actuator buttons of said first and second switches, respectively, whereby when said actuator arm is depressed on said first end it rotates against a baising force of said switch actuator arm and said vertical member an amount sufficient for said first actuator finger under said first end to depress said first actuator button of the said first switch thereunder an amount which activates that said first switch and when pressure on said switch actuator arm is released said switch actuator arm returns to its original position thereby opening said first switch from said biasing force, and whereby when said actuator arm is depressed on said second end it rotates against a biasing force of said switch actuator arm and said vertical member an amount sufficient for said second actuator finger under said second end to depress said second actuator button of the said second switch thereunder an amount which activates that said second switch and when pressure on said switch actuator arm is released said switch actuator arm returns to its original position thereby opening said second switch from said biasing force.

6. The cursor of claim 5 and additionally comprising:
   a) at least two pairs of said switches, said printed circuit board having each of said pair of switches mounted thereon side-by-side with respect to the other of said pair of switches with said actuating buttons thereof pointed vertically upward with respect to said inner surface and with one of said switches disposed longitudinally behind the other; and,
   b) a longitudinal rib extending downward from an inner surface of said case top piece and disposed between said longitudinal side pieces, a first said mounting strip extending traversely between one of said side pieces and said rib and a second said mounting strip extending transversely between the other of said side pieces and said rib, each of said first and second mounting strips comprising a said vertical member extending upward with a said switch actuator arm formed at a top end thereof generally in the contour of a top surface of said top piece, each said switch actuator arm having a pair of actuator fingers extending downward therefrom on opposite sides of said vertical member so as to be in alignment with and in close proximity to a top surface of respective ones of said actuator buttons of a one of said pair of said switches disposed thereunder.

7. A case for a position/movement indicating input device for use with a computer which is simple and inexpensive to build and which includes integral bi-directional self-biased switch activating arms comprising:
   a) a case bottom piece having a flat bottom surface for sliding on a surface to indicate position/movement;
   b) first and second switches wherein said first switch includes a first short stroke actuating button and said second switch includes a second short stroke actuating button;
   c) a printed circuit board sized to fit and disposed on said inner surface of said case bottom piece between said retaining clips, said printed circuit board having said first and second switches mounted thereon with said first and second actuating buttons thereof pointed vertically upward with respect to said inner surface and with said second switch disposed longitudinally behind said first switch;
   d) sensing means carried by said bottom portion for developing a signal reflecting movement of said bottom surface over a surface;
   e) connecting means carried by said bottom portion for connecting a computer to said sensing means and said first and second switches; and,
   f) a case top piece disposed over and releasably attached to said case bottom piece to form a hollow case in combination with said case bottom piece, said case top piece being tapered from a back end thereof towards a front end thereof to give said hollow case the feel of a mouse input device, said case top piece having a pair of longitudinal side pieces with a mounting strip extending traversely between them, said mounting strip comprising a vertical member extending upward towards said case top piece, said vertical member having a switch actuator arm formed at a top end thereof generally in the contour of a top surface of said top piece whereby said vertical member and said switch actuator arm in combination are generally T-shaped in cross-section, said switch actuator arm having first and second ends and first and second actuator fingers associated with said first and second ends, respectively, and extending downward therefrom on opposite sides of said vertical member so as to be in alignment with and in close proximity to a top surface of said first and second actuator buttons of said first and second switches, respectively, whereby when said actuator arm is depressed on said first end it rotates against a biasing force of said switch actuator arm and said vertical member an amount sufficient for said first actuator finger under said first end to depress said first actuator button of the said first switch thereunder an amount which activates that said first switch and when pressure on said switch actuator arm is released said switch actuator arm returns to its original position thereby opening said first switch from said biasing force, and whereby when said actuator arm is depressed on said second end it rotates against a biasing force of said switch actuator arm and said vertical member an amount sufficient for said second actuator finger under said second end to depress said second actuator button of the said second switch thereunder an amount which activates that said second switch and when pressure on said switch actuator arm is released said switch actuator arm returns to its original position thereby opening said second switch from said biasing force.

8. The case of claim 7 and additionally comprising:
a) at least two pairs of said switches, said printed circuit board having each of said pair of switches mounted thereon side-by-side with respect to the other of said pair of switches with said actuating buttons thereof pointed vertically upward with respect to said inner surface and with one of said switches disposed longitudinally behind the other; and,
b) a longitudinal rib extending downward from an inner surface of said case top piece and disposed between said longitudinal side pieces, a first said mounting strip extending transversely between one of said side pieces and said rib and a second said mounting strip extending transversely between the other of said side pieces and said rib, each of said first and second mounting strips comprising a said vertical member extending upward with a said switch actuator arm formed at a top end thereof generally in the contour of a top surface of said top piece, each said switch actuator arm having a pair of actuator fingers extending downward therefrom on opposite sides of said vertical member so as to be in alignment with and in close proximity to a top surface of respective ones of said actuator buttons of one of said pair of said switches disposed thereunder.

* * * * *